Patented Feb. 19, 1924.

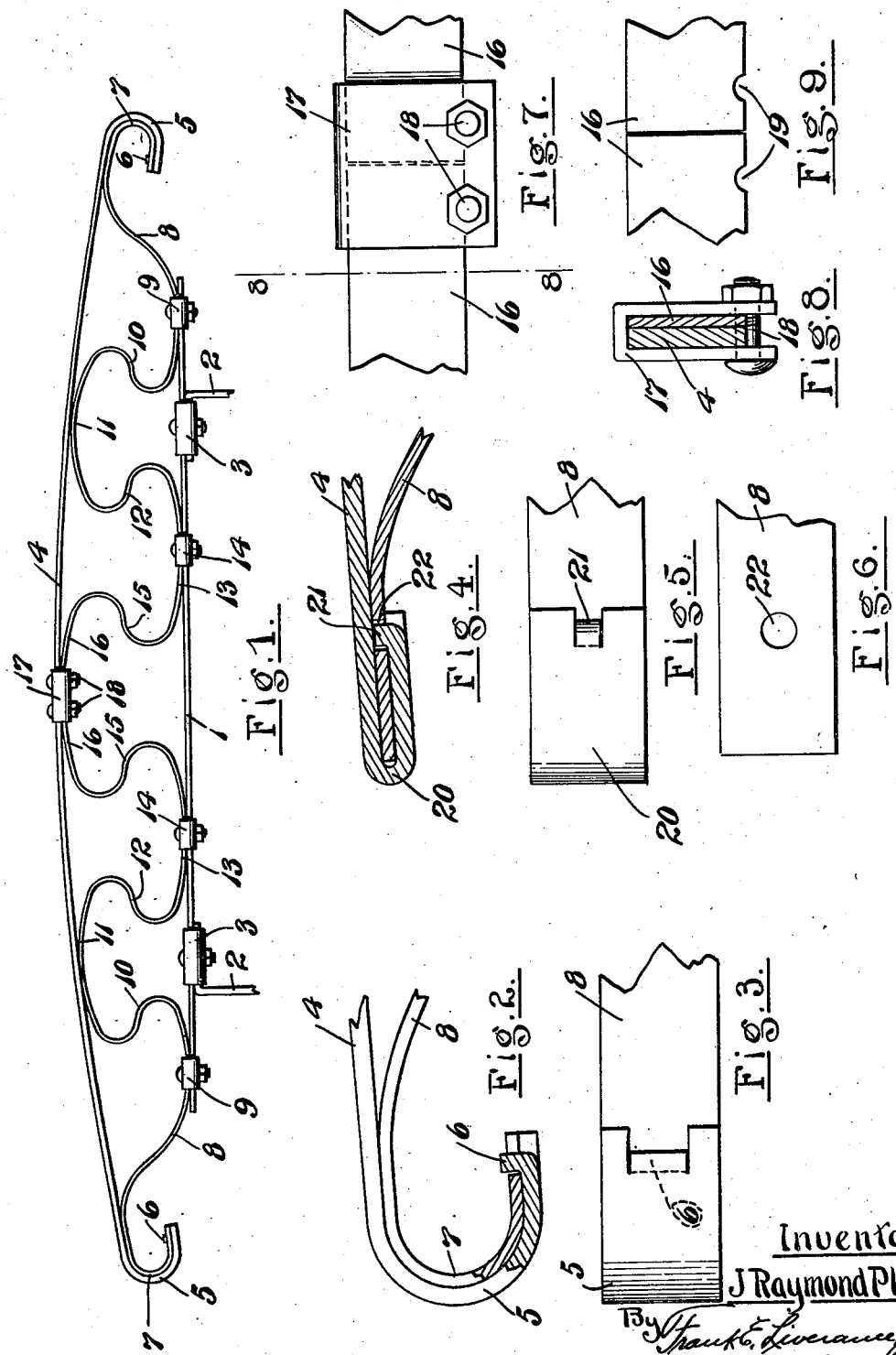

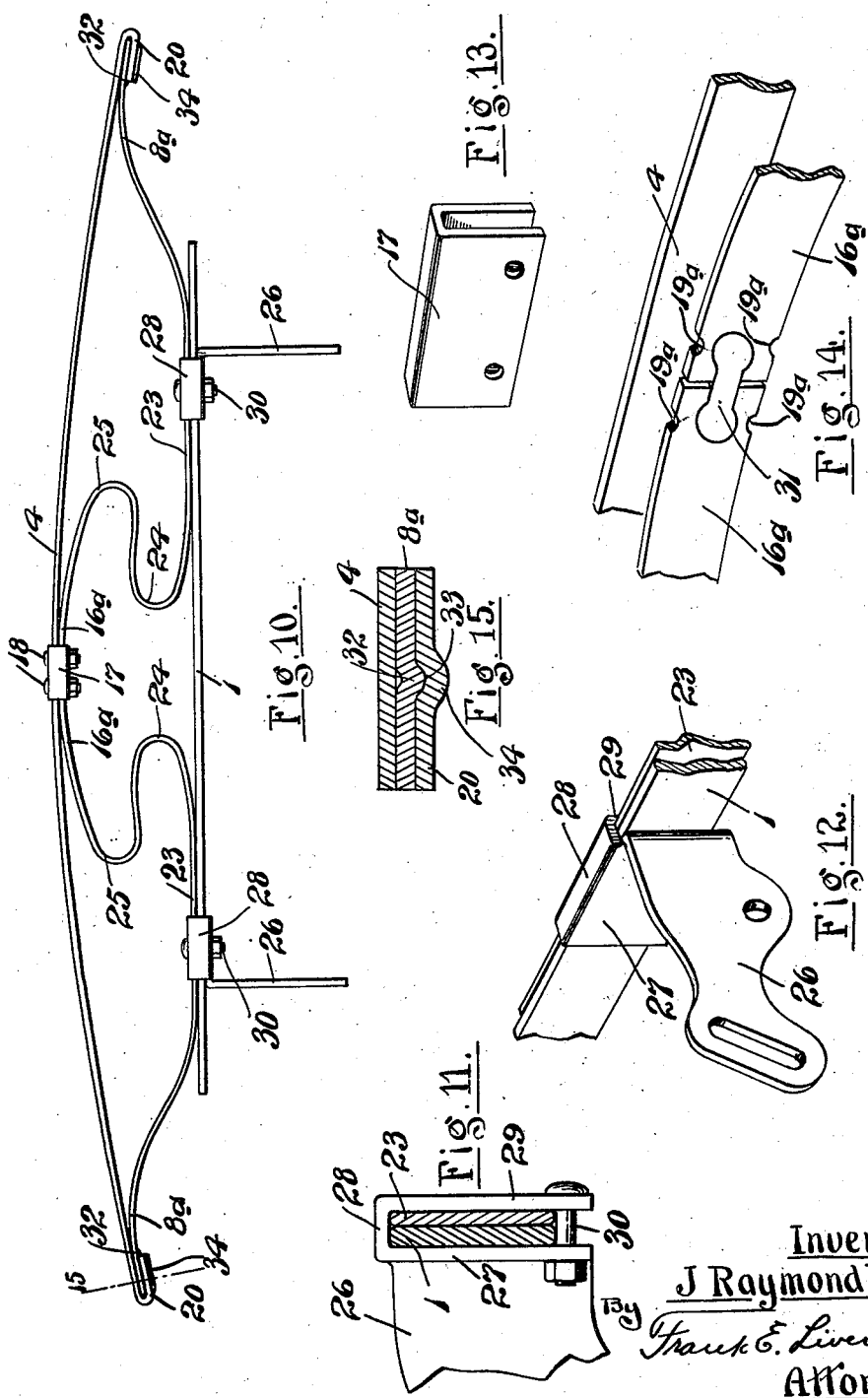

1,484,157

UNITED STATES PATENT OFFICE.

J RAYMOND PLANK, OF GRAND RAPIDS, MICHIGAN, ASSIGNOR TO FRANK E. LIVERANCE, JR., OF GRAND RAPIDS, MICHIGAN.

BUMPER CONSTRUCTION.

Application filed May 28, 1923. Serial No. 641,981.

*To all whom it may concern:*

Be it known that I, J RAYMOND PLANK, a citizen of the United States of America, residing at Grand Rapids, in the county of Kent and State of Michigan, have invented certain new and useful Improvements in Bumper Construction; and I do hereby declare the following to be a full, clear, and exact description of the invention, such as will enable others skilled in the art to which it appertains to make and use the same.

This invention relates to what is known as a bumper adapted to be applied at either the front or rear end of a motor vehicle as a guard against injury to the vehicle likely to come from collision with other vehicles, stationary objects or other objects with which it may collide. It is a primary object and purpose of the invention to make a bumper for this purpose which is particularly capable of withstanding and absorbing the impact of collision without injury to the vehicle to which it is attached, this following from the novel construction of the bumper which is constructed with a novel form of impact absorbing member located between the front rail of the bumper and the rear rail or bar thereof which is attached directly by means of suitable brackets to the ends of the chassis frame members of the vehicle. Other subsidiary objects, relating to novel constructions and arrangements of parts for the practical and workmanlike construction and assembly of the parts making up the bumper will appear, as understanding of the invention is had from the following description, taken in connection with the accompanying drawing, in which, Fig. 1 is a plan view of the bumper made in accordance with my invention.

Fig. 2 is a fragmentary plan view partly in section and enlarged, showing one end of the bumper and the connecting means used for connecting the ends of the front rail and the ends of the spring impact members.

Fig. 3 is a fragmentary rear elevation of an end of the bumper.

Fig. 4 is a fragmentary enlarged horizontal section of a modified form of construction for the end of the bumper.

Fig. 5 is a rear elevation of said modified construction.

Fig. 6 is a fragmentary elevation of the end of the impact spring used with the construction shown in Figs. 4 and 5.

Fig. 7 is a fragmentary rear elevation of the connecting means used for attaching the inner meeting ends of the spring impact members with the front rail.

Fig. 8 is a vertical section taken on the plane of line 8—8, of Fig. 7.

Fig. 9 is a fragmentary elevation showing the two meeting ends of the spring impact members before the attaching means is applied thereto.

Fig. 10 is a plan of another form of construction of bumper made in accordance with my invention.

Fig. 11 is a fragmentary enlarged vertical section through the combined attaching bracket and clip, showing the same as securing the back rail and intermediate spring impact member together.

Fig. 12 is a fragmentary perspective view thereof.

Fig. 13 is a perspective view of the clip used for securing the front rail and the spring impact members together.

Fig. 14 is a fragmentary perspective view of the middle portion of the front rail and the inner abutting ends of the spring impact members prior to the application of the securing clip thereto, and Fig. 15 is an enlarged transverse section on the plane of line 15—15, of Fig. 10.

Like reference characters refer to like parts in the different figures of the drawing.

In the construction of the bumper a back bar or rail 1 of flat bar stock is used which is adapted to be permanently secured to the ends of the side frame members of the chassis, brackets 2 being used for such connection which at one end are formed with clips 3 to pass over the bar, being secured adjustably thereto by means of the usual securing bolts shown.

The front rail 4 of the bumper is also of flat metal of the same width as bar 1, preferably, but may be of less thickness. This bar in the completed bumper is curved in the arc of a circle having a long radius and at each end is curved backwardly making a smooth bend 5. At one end of said bend 5, the metal is cut and a lug 6 turned at right angles from the middle portion of the stock for a purpose which will later appear.

The spring impact members are disposed between the front rail and back bar. There are two of these members of identical construction, each at its outer end having a curved and bent portion 7 to fit within the bends at 5, the extreme ends having portions notched therefrom into which lugs 6 enter. The bends at 7 fit with and contact with the inner sides of the bends 5 for a distance and the spring members then extend inwardly toward the back bar 1 contacting therewith adjacent its ends at said points of contact being permanently secured by U-shaped clips and bolts, indicated at 9. The spring member is then formed into a loop and then reversely curved, as at 10 and formed into a relatively large loop 11 which in the assembled structure bears with considerable pressure against the rear side of the front rail 4 but is not connected thereto. From the loop 11 each member is reversely curved and bent as indicated at 12 and then formed into a loop 13 bearing against the back bar 1 to which it is secured by clip 14. From loop 13, each spring member continues and is reversely curved and bent as indicated at 15, finally terminating in a half-loop portion 16. The two end portions 16 of the two spring members abut at the middle of the front rail 4 and on the rear side thereof. A clip 17 wide enough to cover the ends of the spring members is placed thereover and passes at one side in front of the front rail, and bolts 18 pass through the sides of the clip near the free ends thereof, the lower edges of the ends 16 of the spring members being notched at 19, and the lower edge of the front rail 4 being likewise notched to partly receive the bolts, thereby making a permanent locking connection which precludes any endwise movement of the spring members away from each other or with reference to the front rail, as is evident.

In Figs. 4, 5 and 6, a slight modification in construction is shown, the ends of the front rail 4 being bent back sharply upon themselves as at 20, the end of the return portions being slit and lugs 21 turned inwardly as before, the ends of said lugs coming against the rear side of the front rail. The outer ends of the spring members have no bend therein but are flat so as to pass between the rail 4 and the return portions 20 thereof, an opening 22 being made in the outer end of each spring member for the lugs 21 to pass through. The parts 20 are merely sprung away from the rail 4 sufficient to enter the outer ends of the spring members and permit the lugs 21 entrance into the openings 22.

In Figs. 10 to 14 inclusive, another form of the invention is illustrated, simpler in construction and more economical to produce. The back and front rails are substantially the same as before described, the intermediate spring impact members being of different form. Each of the spring impact members has an outer end portion 8$^a$ which is connected with an end of the front rail as will be later described. Said outer end portions 8$^a$ of the two parts of the spring impact member extend to the front side of the back bar or rail 1 and each is formed with a portion 23 which lies alongside of the back rail for a distance, the parts being then formed into a double reverse loop construction, the loops of which are shown at 24 and 25, the former lying behind the latter. From the loops 25 said parts are extended and formed into end portions 16$^a$, similar to the parts 16 in the structure shown in Fig. 1, the ends of which substantially abut directly back of the middle of the front rail 4. The same method of securing the abutting ends of the two parts of the spring impact member to the front rail, as previously described with reference to the structure shown in Fig. 1, may be used, slip 17 and bolts 18 being used, the bolts partly seating in the notches 19$^a$ in the impact member parts, which, as I have shown in Fig. 14, are provided in both the upper and lower edges of said parts, there being no need to consider rights and lefts in the matter of the spring impact member parts in the assembly when notched in this manner. In addition, or as a substitute, I prefer to use the connection, also shown in Fig. 14, between the adjacent ends of the two parts of the spring impact member, the adjacent ends of said parts being slotted and a member 31, similar to a dumb bell in shape, being placed therein, the slots being shaped to fit the member which has enlarged ends whereby the two parts of the impact member are held against endwise separation. With such construction, the notches 19$^a$ are not absolutely essential and may be eliminated if desired, the bolts 18 passing under and over the front rail and the impact member parts when the notches are not used.

The same bracket and clip construction shown in Fig. 1 may be used for attaching the bumper to the chassis frame members of the automobile, except that instead of passing over the back bar 1 alone, the clips pass over the back bar and the adjacent part 23 of the spring impact member. In Figs. 10, 11 and 12, I have shown a modified form of structure, equivalent in all respects in which the bracket and clip are combined in one piece being made from one piece of metal. This bracket and clip comprises a rearwardly extending bracket portion 26, turned at right angles at its front end to make a side 27 to lie along the rear side of the back rail and forming one part of the clip. Said side 27, at its upper edge is turned forwardly substantially at right angles, making an upper side 28 of the clip, which is completed by a second side 29 turned downwardly from the upper side 28 parallel to the first side 27. The back rail and contacting portion of each spring impact member are located between the sides of the clip, and the usual bolt 30 is used to bond the parts together. This makes a simple and relatively inexpensive construction, eliminating a separate clip and making a neater and more compact appearance.

In Fig. 15, I have shown what I term a "slip shuttle" connection between the ends of the front rail 1 and the ends of the outer portions 8ª of the spring impact members. The outer end of each portion 8ª is formed with a downwardly pressed substantially centrally located rib 32, and the inner backwardly turned end of the part 20 at each end of the front rail is likewise formed with a coacting rib receiving groove 33 to receive the rib 32, the groove being on the inner side of the part 20, and a rib 34 made on forming the groove on the outside. This permits very ready assembly and a secure connection which is capable of detachment on what is known as "side swiping" of the bumper, but incapable of detachment from front blows. It is a very valuable minor feature of the invention.

This construction of bumper has a spring impact receiving construction between the front rail and back bar in both forms, so constructed that it will yield on receiving impact blows transmitted from the front rail and return to original position after the impact force has expended its energy. The spring members contact with the front rail and back bar at a number of points whereby there is made a very strong and perfect impact receiving construction, serving its purpose irrespective of the point of impact as applied to the front rail. The reverse bends in the spring members are very valuable features of the structure, giving resiliency and resisting power and reinforcing the bumper between its ends. The spring members are of flat stock, tempered and treated to withstand hard usage and in every way the structure is particularly adapted as a protective guard for motor vehicles, guarding and protecting the same against blows and collisions. The appended claims define the invention and it is to be considered that all constructions coming within their scope are comprehended by my invention.

I claim:

1. A device of the class described, comprising a front rail, a member formed of two parts located back of the front rail and having a sliding connection at their outer ends with the ends of the front rail and bearing against the said front rail substantially at the middle thereof and at the inner ends of said parts, and means for connecting said parts of the member to the front rail at said middle portion thereof, substantially as described.

2. A device of the class described, comprising a front rail formed at each end with a short portion bent back and substantially paralleling the main portion of the rail at the ends thereof, a spring impact member located back of the front rail having ends received in the loops formed at the ends of the front rail, said impact member including a central portion bearing against the rear side of the front rail substantially at the middle point thereof, and means for connecting the front rail and impact member together at said point, substantially as described.

3. A device of the class described, comprising a front rail, a spring impact member located back of the front rail and comprising two parts, the outer end of each of said parts being joined to an end of the front rail and extending inwardly therefrom and formed with sections for the connection of supporting brackets for the bumper thereto, said sections of the two parts lying in alinement, and means connecting the inner ends of said parts to the front rail between the ends of said front rail.

4. A device of the class described, comprising a front rail formed at each end with a return bend loop of U-shape, with one side of each loop formed with a longitudinal groove therein, a spring impact member located back of the front rail bearing against the front rail at its intermediate portion and having its ends received in said U-shaped loops at the ends of the front rail, said impact member at its outer ends being formed with a short longitudinal ridge to enter the said grooves in the sides of the U-shaped loops, and means connecting the front rail and impact member together at their middle points, substantially as described.

5. A device of the class described, comprising a front rail, a spring impact member located back of the front rail and formed of two parts, each having an outer end joined with an end of the front rail and then being bent away from the front rail for a distance and then bent to extend directly toward the other part for a distance and then formed into a double reverse bend with their inner ends coming together and substantially abutting back of the front rail and at the middle thereof, and means connecting the inner ends of the said parts and the front rail together, substantially as described.

6. A construction containing the elements in combination defined in claim 5, combined with means for connecting the abutting ends of said parts of the impact member together in alinement with each other, substantially as described.

7. A construction containing the elements in combination defined in claim 5, the inner ends of the said parts of the spring impact member being formed with short longitudinal slots having enlarged portions at their closed ends, and a short bar having enlarged portions at its ends located in said slots and serving to tie the two parts of the spring impact member together, substantially as described.

8. A device of the class described, comprising a front rail, a spring impact member located back of the front rail and formed of two parts, each having its outer end joined with an end of the front rail and then bent away from the front rail for a short distance and then bent to extend directly inward for a distance and then formed into a double reverse bend with the inner ends of the parts coming together at the middle and at the back of the front rail, and means for connecting the inner ends of the said parts together coupled with means for connecting the said parts and front rail together.

9. A device of the class described, comprising a front rail, a cushion impact member located back of the front rail, means for detachably joining the front rail and said member at the ends thereof, and means for connecting the said rail and member at their middles, said impact member including two sections in alinement with each other to which connecting brackets are adapted to be secured, substantially as described.

10. A device of the class described, comprising a front rail having backwardly turned ends making U-shaped sockets, a spring impact member formed from flat bar material having ends received in said sockets and at its middle bearing against the front rail and formed intermediate its points of connection with the rail into spring impact resisting forms, and means connecting the said member and rail at the middles thereof.

11. A device of the class described, comprising a front rail, a member located back of the front rail including two parts having ends abutting directly back of and in contact with the front rail, means for detachably connecting said parts in alinement, and a U-shaped clip embracing the front rail and the ends of said parts and covering said connecting means, substantially as described.

12. A device of the class described, comprising a back bar, a front rail, and a spring impact member connected at opposite ends to the ends of the rail and at its middle to the rail, and at a plurality of points in its length to the back bar, substantially as described.

13. A device of the class described comprising a back bar, a front rail, and a spring impact member located between the bar and the rail and secured thereto, said member being formed of flat bar spring material joined at its ends to the ends of the front rail and bent to alternately contact with the bar and rail, substantially as described.

14. A device of the class described, comprising a back bar and front rail, a spring impact member located between the bar and the rail and bent into form to contact with the front rail at its middle and its ends and with the back bar at two spaced apart points located toward the ends of the back bar, and means positively connecting the impact member to the front rail at its middle and to the back bar at both points of contact.

15. A device of the class described, comprising a front rail, spring impact means located back of the front rail and comprising two parts, the outer end of each of said parts being joined to an end of the front rail and extending inwardly therefrom and then bent into resilient loop formation toward the front rail and connected to said front rail between the ends thereof, substantially as described.

In testimony whereof I affix my signature.

J. RAYMOND PLANK.